(12) United States Patent
Takahashi et al.

(10) Patent No.: US 9,274,401 B2
(45) Date of Patent: Mar. 1, 2016

(54) FOCAL-PLANE SHUTTER AND OPTICAL DEVICE

(71) Applicant: SEIKO PRECISION INC., Narashino-shi (JP)

(72) Inventors: Hiroshi Takahashi, Narashino (JP); Mitsuru Suzuki, Narashino (JP); Minori Murata, Narashino (JP); Makoto Toriumi, Narashino (JP)

(73) Assignee: SEIKO PRECISION INC., Narashino-shi (JP)

( * ) Notice: Subject to any disclaimer, the term of this patent is extended or adjusted under 35 U.S.C. 154(b) by 0 days.

(21) Appl. No.: 14/700,687

(22) Filed: Apr. 30, 2015

(65) Prior Publication Data
US 2015/0234255 A1 Aug. 20, 2015

Related U.S. Application Data

(63) Continuation of application No. PCT/JP2013/078869, filed on Oct. 24, 2013.

(30) Foreign Application Priority Data

Nov. 1, 2012 (JP) .................................. 2012-241982

(51) Int. Cl.
*G03B 9/08* (2006.01)
(52) U.S. Cl.
CPC ........................................ *G03B 9/08* (2013.01)
(58) Field of Classification Search
CPC .......................................................... G03B 9/08

USPC ................................... 396/357, 456, 479, 489
See application file for complete search history.

(56) References Cited

U.S. PATENT DOCUMENTS

| 4,847,649 | A | * | 7/1989 | Toyoda et al. | 396/456 |
| 4,977,421 | A | * | 12/1990 | Fukuda | 396/489 |
| 2002/0136555 | A1 | | 9/2002 | Watabe | |
| 2004/0223756 | A1 | * | 11/2004 | Nakano et al. | 396/489 |
| 2005/0238346 | A1 | | 10/2005 | Uematsu | |

FOREIGN PATENT DOCUMENTS

| JP | H09-244100 | 9/1997 |
| JP | 2002-287210 A1 | 10/2002 |

(Continued)

OTHER PUBLICATIONS

International Search Report for International Application No. PCT/JP2013/078869 dated Feb. 4, 2014.

*Primary Examiner* — Clayton E LaBalle
*Assistant Examiner* — Dennis Hancock
(74) *Attorney, Agent, or Firm* — Kratz, Quintos & Hanson, LLP (57) ABSTRACT

A focal-plane shutter includes: a board including an opening; a blade opening and closing the opening; a rotor of an actuator for driving the blade; an output member rotated by the rotor and including a first gear portion; a drive member including a second gear portion meshing with the first gear portion, rotating about a predetermined axis, and driving the blade; and a positioning portion abutting with the drive member and defining an end of a rotational range of the drive member, wherein the first and second gear portions and the positioning portion overlap one another in a plane direction perpendicular to the axis.

8 Claims, 5 Drawing Sheets

(56) References Cited　　　　　　　　* cited by examiner

FOREIGN PATENT DOCUMENTS

| JP | 2006-208704 A1 | 8/2006 |
| JP | 2008-275778 A1 | 11/2008 |

FOCAL-PLANE SHUTTER AND OPTICAL DEVICE

CROSS-REFERENCE TO RELATED APPLICATION

This application is a continuation of and claims priority to International Patent Application No. PCT/JP2013/078869 filed on Oct. 24, 2013, which claims priority to Japanese Patent Application No. 2012-241982 filed on Nov. 1, 2012, subject matter of these patent documents is incorporated by reference herein in its entirety.

BACKGROUND (i) Technical Field

The present invention relates to focal-plane shutters and optical devices.

(ii) Related Art

There is known a focal-plane shutter in which an actuator drives a blade. A drive member is rotated by receiving the drive force from the actuator, so the blade moves. Japanese Unexamined Patent Application Publication No. 2002-287210 discloses such a focal-plane shutter.

There may be provided a positioning portion abutting the drive member and defining a rotation start position of the drive member. The force is exerted on the drive member at a different position in the direction of the rotational axis of the drive member, so the drive member might tilt from its desired posture even in a state of being positioned by the positioning portion. The drive member tilts in the positioned state, so varying a rotation start position of the drive member, and which might vary an operating property of the blade.

SUMMARY

According to an aspect of the present invention, there is provided a focal-plane shutter including: a board including an opening; a blade opening and closing the opening; a rotor of an actuator for driving the blade; an output member rotated by the rotor and including a first gear portion; a drive member including a second gear portion meshing with the first gear portion, rotating about a predetermined axis, and driving the blade; and a positioning portion abutting with the drive member and defining an end of a rotational range of the drive member, wherein the first and second gear portions and the positioning portion overlap one another in a plane direction perpendicular to the axis.

DETAILED DESCRIPTION

Figure 1:
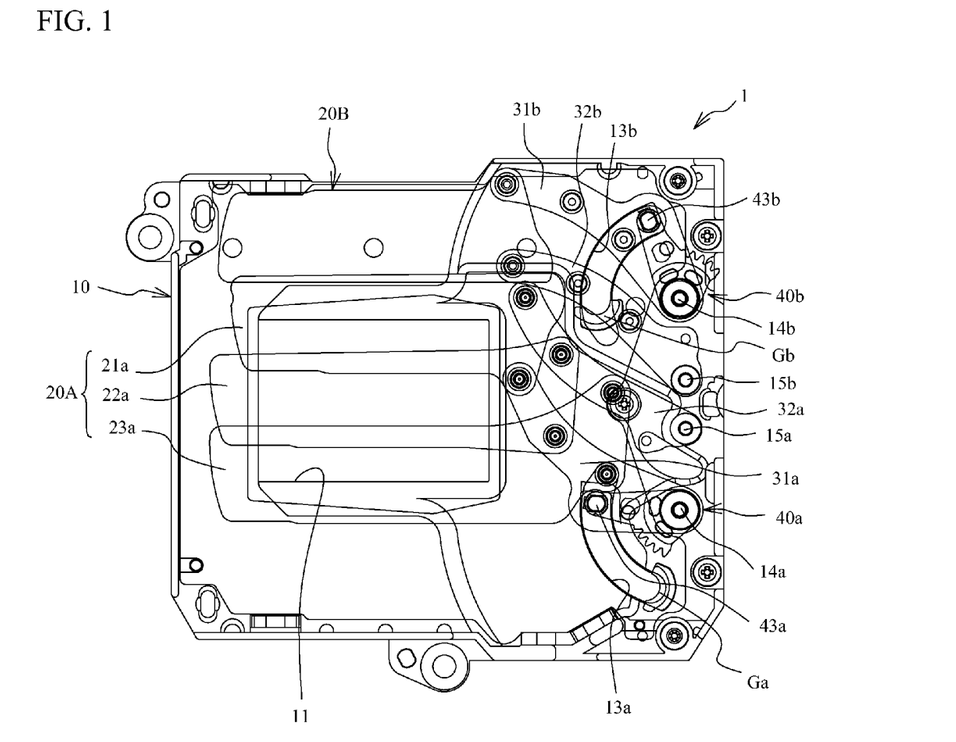
FIG. 1 is a front view of inner structure of a focal-plane shutter according to the present embodiment.
Figure 2:
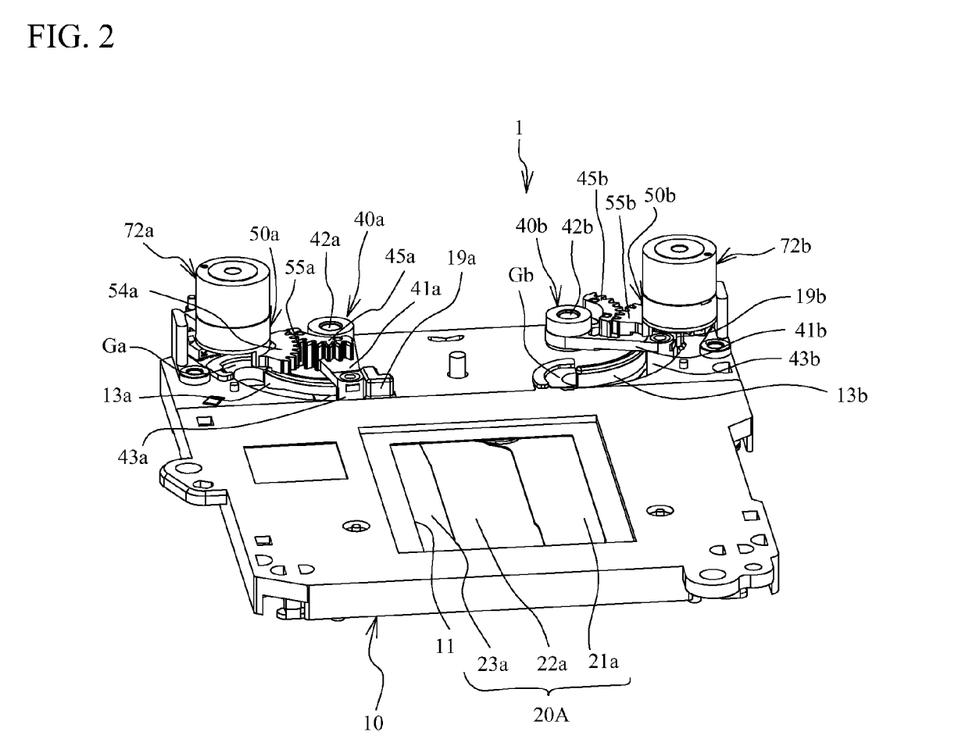
FIG. 2 is an external perspective view of the focal-plane shutter.

FIG. 1 is a front view of inner structure of a focal-plane shutter 1 according to the present embodiment. FIG. 2 is an external perspective view of the focal-plane shutter 1. The focal-plane shutter 1 is employed in an optical instrument such as a digital camera or a still camera. The focal-plane shutter 1 includes a board 10, a leading blade 20A, a trailing blade 20B, arms 31a, 32a, 31b, and 32b, drive members 40a and 40b, output members 50a and 50b, and rotors 72a and 72b. Additionally, the rotors 72a and 72b, and the output members 50a and 50b are omitted in FIG. 1. The board 10 includes an opening 11. The leading blade 20A and the trailing blade 20B open and close the opening 11. The rotor 72a is included in an actuator for driving the leading blade 20A. The rotor 72b is included in an actuator for driving the trailing blade 20B. Each actuator includes a stator around which a coil is wound, and is omitted in FIGS. 1 and 2.

The leading blade 20A includes plural blades 21a to 23a. The trailing blade 20B also includes plural blades. Each of the leading blade 20A and the trailing blade 20B can shift between an overlapped state where the plural blades overlap one another and an expanded state where the plural blades are expanded. These plural blades recede from the opening 11 in the overlapped state to bring the opening 11 into a fully opened state. These plural blades close the opening 11 in the expanded state to bring the opening 11 into a fully closed state. FIGS. 1 and 2 illustrate the state where the expanded leading blade 20A closes the opening 11 and the trailing blade 20B recedes from the opening 11. In other words, FIGS. 1 and 2 illustrates a set state before an exposure operation.

The leading blade 20A is connected to the arms 31a and 32a. The trailing blade 20B is connected to the arms 31b and 32b. As illustrated in FIG. 1, the arms 31a, 32a, 31b, and 32b are rotatably supported by spindles 14a, 15a, 14b, and 15b provided in the board 10.

The drive members 40a and 40b drive the arms 31a and 31b, respectively. The drive members 40a and 40b are provided with drive pins 43a and 43b connected to the arms 31a and 31b, respectively. The board 10 is formed with escape slots 13a and 13b for permitting the movement of the drive pins 43a and 43b, respectively. The drive members 40a and 40b will be described later in detail. The rotors 72a and 72b are respectively connected to the output members 50a and 50b. The rotation of the rotors 72a and 72b rotates the output members 50a and 50b, so the drive members 40a and 40b rotates, which drives the leading blade 20A and the trailing blade 20B, respectively. The positions of rotational axes of the output members 50a and 50b and the drive members 40a and 40b are different from one another.

As illustrated FIG. 2, the board 10 is formed with a positioning portion 19a near one end of the escape slot 13a. Likewise, a positioning portion 19b is formed near one end of the escape slot 13b. The positioning portion 19a is an example of a positioning portion abutting with a drive member and defining an end of a rotational range of the drive member. The positioning portions 19a and 19b protrude from a surface of the board 10. The rotor 72a rotates and the drive member 40a is urged against the positioning portion 19a, so the positioning portion 19a is positioned. In particular, the positioning portion 19a defines the position of the drive member 40a in the set state before the exposure operation. Namely, the positioning portion 19a defines the rotation start position of the drive member 40b in starting the exposure operation. The positioning portion 19a defines the position of the drive member 40a in a state where the leading blade 20A closes the opening 11. Likewise, the positioning portion 19b defines the rotation start position of the drive member 40b in starting the exposure operation. The other ends of the escape slots 13a and 13b are provided with rubbers Ga and Gb for absorbing the impact of the drive members 40a and 40b, respectively. In addition, the board 10 is assembled with a holder holding the above actuators not illustrated.

Figure 3:
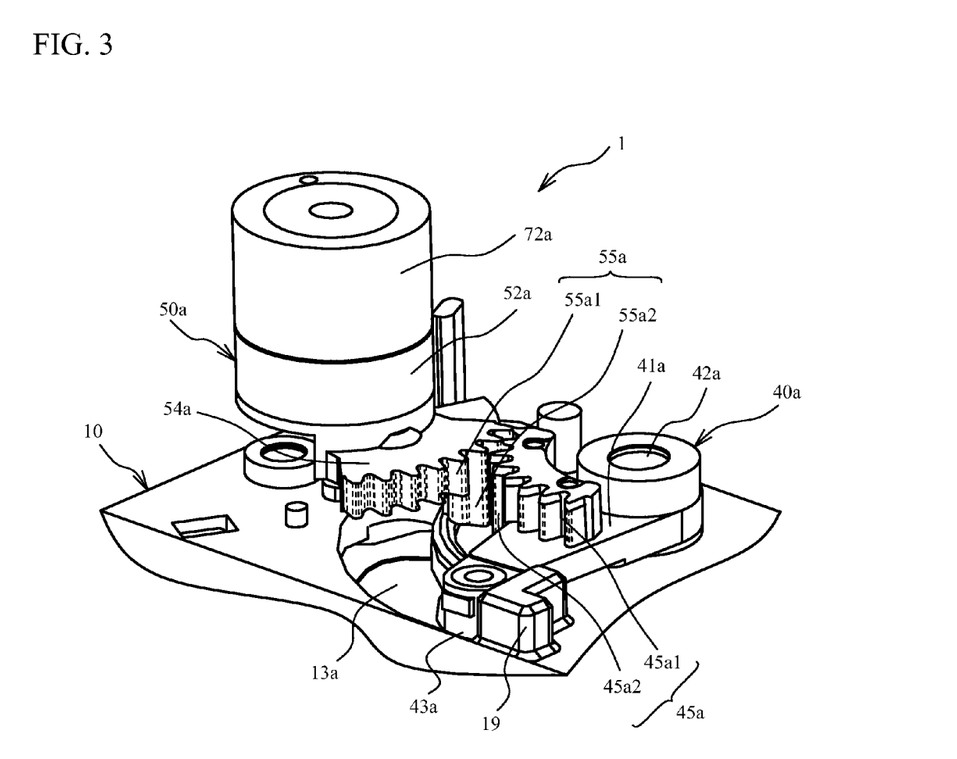
FIG. 3 is an enlarged view of a rotor, a drive member, and an output member.

FIG. 3 is an enlarged view of the rotor 72a, the drive member 40a, and the output member 50a. The drive member 40a includes: an arm portion 41a having a plate shape; a support hole 42a formed in an end of the arm portion 41a and serving as a fulcrum for rotation; and the drive pin 43a formed in another end of the arm portion 41a and extending in a predetermined direction. Further, an upper portion of the arm portion 41a is formed with a gear portion 45a serving as a second gear portion. The rotor 72a is magnetized to have different polarities in the circumferential direction. A lower portion of the rotor 72a is fitted into the output member 50a. Thus, the output member 50a rotates together with the rotor 72a. The drive member 40a includes the gear portion 45a serving as the second gear portion and meshing with a first gear portion 55a of the output member 50a to be described later. The drive member 40a is an example of a drive member rotating about a predetermined axis and driving the blade.

The output member 50a includes: a cylindrical portion 52a fitted onto the lower portion of the rotor 72a and having a substantially cylindrical shape; a protruding portion 54a protruding radially outward from the cylindrical portion 52a; and the gear portion 55a formed in an end of the protruding portion 54a and serving as the first gear portion. The gear portion 55a of the output member 50a meshes with the gear portion 45a of the drive member 40a. Thus, the drive force of the output member 50a is transmitted to the drive member 40a. The drive member 40b and the output member 50b have the similar arrangements.

As illustrated in FIGS. 2 and 3, the gear portion 45a includes: a thin portion 45a1 formed on the arm portion 41a; a thick portion 45a2 thicker than the thin portion 45a1 and formed in the side of the arm portion 41a. That is, the thin portion 45a1 and the thick portion 45a2 differ from each other in thickness in the direction of the axis about which the drive member 40a rotates. Likewise, the gear portion 55a includes a thin portion 55a1 and a thick portion 55a2 different from each other in the axial direction. In response to the rotation of the rotor 72a, the thin portions 45a1 and 55a1 mesh with each other, and the thick portions 45a2 and 55a2 mesh with each other. Further, As illustrated in FIGS. 2 and 3, when the drive member 40a is positioned by the positioning portion 19a, the thick portions 45a2 and 55a2 mesh with each other, and the thin portions 45a1 and 55a1 are spaced from each other. The drive member 40b and the output member 50b have the similar arrangements. As illustrated in FIG. 2, when the drive member 40b is positioned by the positioning portion 19b, thin portions of gear portions 45b and 55b mesh with each other, and thick portions are spaced from each other.

Figure 4:
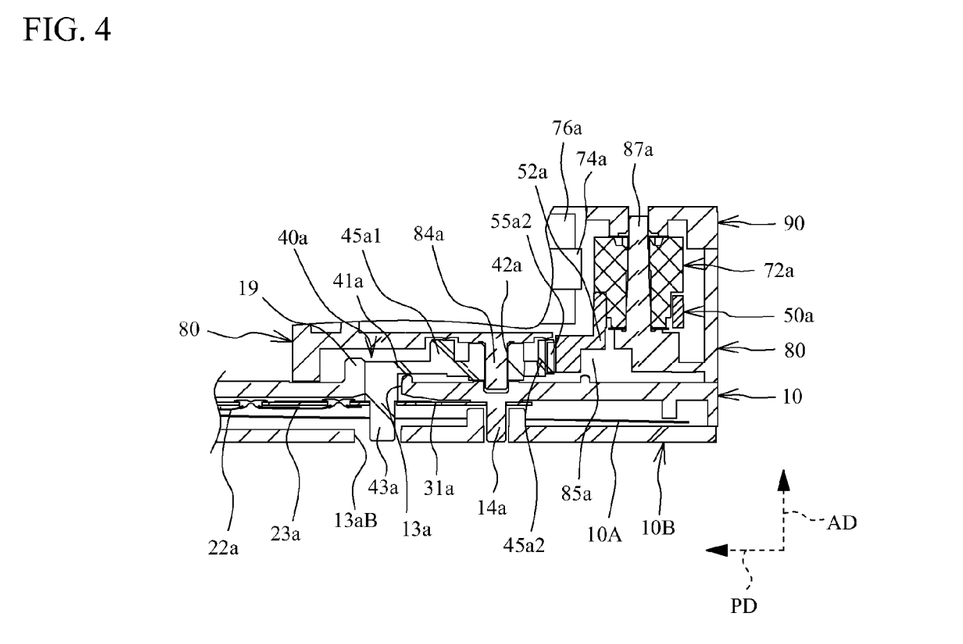
FIG. 4 is a sectional view around the rotor, the drive member, and the output member.

FIG. 4 is a sectional view around the drive member 40a, the output member 50a, and the rotor 72a. Additionally, FIG. 4 is the sectional view taken along line passing through the rotational center of the rotor 72a, the support hole 42a, and the drive pin 43a in FIG. 3. As illustrated in FIG. 4, the focal-plane shutter 1 includes boards 10A and 10B besides the board 10. The board 10A is provided between the boards 10 and 10B. Like the opening 11 provided in the board 10, an opening is provided in each of the boards 10A and 10B. The leading blade 20A and the arm 31a and the like are arranged between the boards 10 and 10A. The trailing blade 20B and the arm 31b and the like are arranged between the boards 10A and 10B.

Holders 80 and 90 assembled on the board 10 holds the actuator. The actuator includes the rotor 72a, a stator 74a, and a coil 76a. The holder 80 is assembled on the board 10, and the holder 90 is assembled on the holder 80. A spindle 84a of the holder 80 is fitted into the support hole 42a of the drive member 40a for rotation. Therefore, the drive member 40a is rotatably supported. The drive pin 43a extends in a predetermined direction and is connected to the arm 31a arranged between the boards 10 and 10A. As mentioned above, the arm 31a is connected to the leading blade 20A. The connection of the output member 50a and the drive member 40a is ensured through an escape hole 85a formed in the holder 80. Specifically, the gear portions 45a and 55a are positioned within the escape hole 85a.

In FIG. 4, the axial direction AD, and the plane direction PD perpendicular to the axial direction AD are illustrated. The axial direction AD means the axial direction of the spindle 84a supporting the drive member 40a for rotation. Additionally, the axial direction AD coincides with the direction of the optical axis passing through the opening 11. Further, to support the drive member 40a for rotation, a predetermined clearance is set between the spindle 84a and the support hole 42a. Thus, even in a case where the positioning portion 19a is not provided in the present embodiment as will be described later, the drive member 40a might tilt relative to the axial direction AD under a predetermined condition.

In the set state before the exposure operation, the rotor 72a rotates, so the end portion of the arm portion 41a of the drive member 40a is urged against the positioning portion 19a. Thus, the thick portions 45a2 and 55a2 mesh with each other at this time, so the drive member 40a receives the force from the gear portion 55a. In the present embodiment, as illustrated in FIG. 4, the positioning portion 19a protrudes from the surface of a side of the board 10 in which the drive member 40a and the rotor 72a are provided. Herein, the thick portions 45a2 and 55a2 meshing each other and the positioning portion 19a overlap one another in the plane direction PD. Thus, even when the force is exerted on the drive member 40a from the gear portion 55a in the plane direction PD due to the meshing of the thick portion 45a2 with the thick portions 55a2, the drive member 40a can be held by the positioning portion 19a. Therefore, the rotation start position of the drive member 40a can be defined such that the drive member 40a does not tilt relative to the axis of the spindle 84a. Also, the variation in the rotation start position of the drive member 40a can be suppressed, whereby the variation in the moving start position of the leading blade 20A can be suppressed. This also suppresses a variation in the exposure period from the time when the leading blade 20A starts opening the opening 11 to the time when the trailing blade 20B fully closes the opening 11, thereby keeping the image quality constant.

Here, it is assumed that the positioning portion 19a or the thick portions 45a2 and 55a2 are not provided, that is, that the positioning portion does not overlap the gear portions meshing with each other in the plane direction PD. In this case, when the force is exerted on the drive member 40a from the gear portion 55a, the drive pin 43a abuts with the inner edge of the end of the escape slot 13a, so the reaction force is exerted on the drive pin 43a. The position of the drive member 40a on which the force is exerted from the gear portion 55a differs from the position of the drive pin 43a on which the force is exerted from the inner edge of the escape slot 13a in the axial direction AD. Thus, depending on the balance between both forces, the whole of the drive member 40a might tilt relative to the axial direction AD. In such a case, the forces are exerted on the plural different positions of the drive member 40a in the plane direction PD, so that the drive member 40a might tilt relative to the spindle 84a, which might vary the rotation start position of the drive member 40a. In the present embodiment, the thick portions 45a2 and 55a2 and the positioning portion 19a are provided to overlap one another in the plane direction PD, thereby suppressing such a problem described above.

Next, a description will be given of the drive member 40b driving the trailing blade 20B. As described above, by the meshing of the gear portion 55b, serving as the first gear portion, of the output member 50b with the gear portion 45b, serving as the second gear portion, of the drive member 40b, the drive force of the output member 50b is transmitted to the drive member 40b. In the set state before the exposure operation illustrated in FIG. 2, by the abutment of the drive pin 43b of the drive member 40b with the positioning portion 19b provided near the end of the escape slot 13b, the rotational range of the drive member 40b is partially defined.

As illustrated in FIG. 2, the thin portions of the gear portions 45b and 55b meshing with each other, and the positioning portion 19b do not overlap each other in the plane direction PD. In the present embodiment, the position of the drive member 40b on which the force is exerted from the gear portion 55b and the reaction force which the drive pin 43b receives from the positioning portion 19b are arranged near a support hole 42b serving as the fulcrum of the rotation of the drive pin 43b. Thus, the whole of the drive member 40b has little possibility of tilting relative to the axial direction AD.

However, depending on the size of the opening 11, or on the position of the drive member 40b or the output member 50b, the drive member 40b might tilt relative to the axial direction AD. In this case, the positioning portion 19b may further protrudes from the surface of the board 10 to provide a positioning member. This positioning member is configured to overlap the thin portions of the gear portions 45b and 55b meshing with each other in the plane direction PD, thereby suppressing the drive member 40b from tilting relative to the axial direction AD. It is thus possible to suppress the variation in the rotation start position of the drive member 40b and to suppress the variation in the moving start position of the trailing blade 20B, so this can suppress the variation in the exposure period, thereby keeping the image quality constant.

Figure 5:
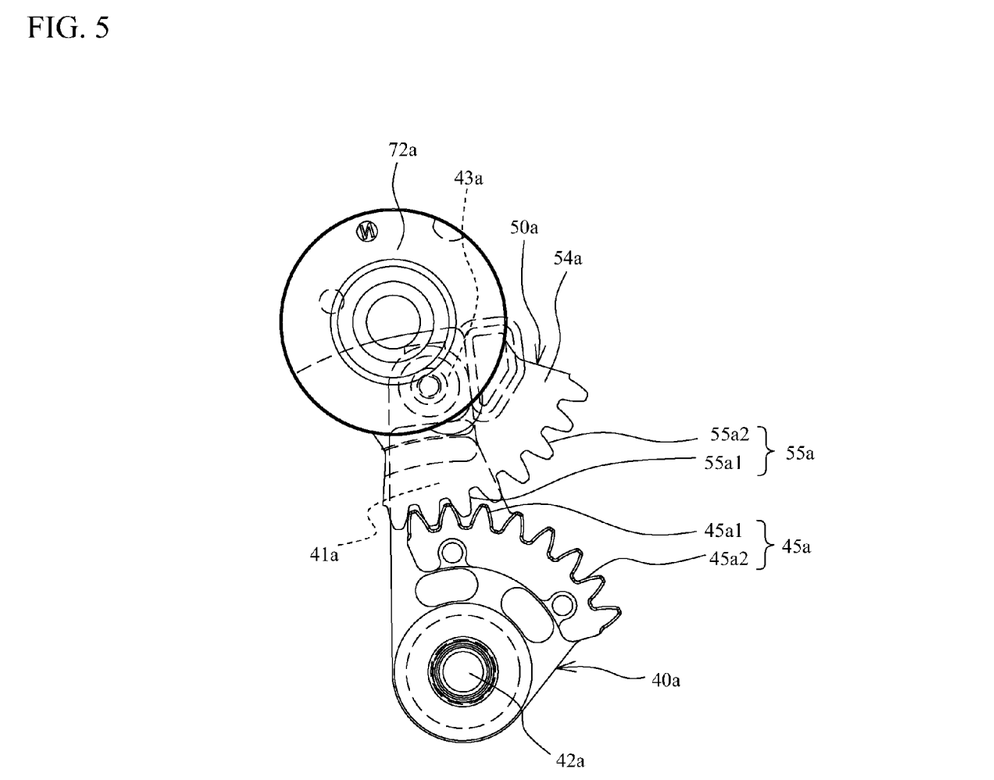
FIG. 5 is an explanatory view of a positional relationship between the drive member and the output member after an exposure operation.

Next, a description will be given of the drive member 40a and the output member 50a after the exposure operation. FIG. 5 is an explanatory view of a relationship between the drive member 40a and the output member 50a after the exposure operation. Additionally, in FIG. 5, the board 10, the escape slot 13a, and the like are omitted. When the drive member 40a starts rotating, the arm portion 41a passes between the thin portion 55a1 and the board 10 and moves to the other end of the escape slot 13a. Therefore, as illustrated in FIG. 5, a part of the arm portion 41a, specifically, the end portion formed with the drive pin 43a in the arm portion 41a overlaps the thin portion 55a1 when viewed in the axial direction AD. The thin portion 55a1 is partially formed in the gear portion 55a in this way, thereby allowing the drive member 40a to partially overlap the output member 50a in the axial direction AD. This enables the drive member 40a to be arranged close to the output member 50a, so an increase in size of the focal-plane shutter 1 is suppressed.

Further, as illustrated in FIG. 5, the drive pin 43a overlaps the rotor 72a. Specifically, the movement locus of the drive pin 43a partially overlaps the rotor 72a. The rotor 72a and the drive member 40a are arranged in this way, which achieving a reduction in size of the focal-plane shutter 1 in the plane direction.

The drive pin 43b has the same arrangements. Herein, the position of the drive member 40a after the exposure operation corresponds to the position of the drive member 40b before the exposure operation. That is, as illustrate in FIG. 2, a part of an arm portion 41b, specifically, the end portion formed with the drive pin 43b in the arm portion 41b overlaps the thin portion 55b1 of the output member 50b when viewed in the axial direction AD. The thin portion is partially formed in the gear portion 55b in this way, thereby allowing the drive member 40b to partially overlap the output member 50b in the axial direction AD. This enables the drive member 40b to be arranged close to the output member 50b, so an increase in size of the focal-plane shutter 1 is suppressed.

Likewise, in the set state before the exposure operation, the drive pin 43b also overlaps the rotor 72b. Specifically, the movement locus of the drive pin 43b partially overlaps the rotor 72b. The rotor 72b and the drive member 40b are arranged in this way, which achieving a reduction in size of the focal-plane shutter 1 in the plane direction.

Further, as illustrated in FIG. 4, the gear portion 45a of the drive member 40a and the gear portion 55a of the output member 50a are positioned within the escape hole 85a of the holder 80. Therefore, the focal-plane shutter is reduced in thickness.

Furthermore, the size of the escape hole 85a is set to such a degree that the connection of the gear portions 45a and 55a is possible. For this reason, the escape hole 85a has a comparatively large size. Thus, the holder 80 is reduced in weight.

Moreover, since the gear portions 45a and 55a are connected to each other within the escape hole 85a, the drive member 40a can be arranged close to the output member 50a. It is therefore possible to reduce the whole size of the drive member 40a and the output member 50a. This reduces the whole weight of the drive member 40a and the output member 50a. Thus, the focal-plane shutter 1 is reduced in weight.

While the exemplary embodiments of the present invention have been illustrated in detail, the present invention is not limited to the above-mentioned embodiments, and other embodiments, variations and modifications may be made without departing from the scope of the present invention.

Only the leading blade 20A may be driven by the actuator, and the trailing blade 20B may be driven by an electromagnet and a spring. The positioning portion may be provided in the holder 80 side, instead of providing the positioning portion 19a in the board 10 side. The positioning portion 19a may be separately formed from the board 10, and may be made of, for example, a synthetic resin or a rubber.

Finally, several aspects of the present invention are summarized as follows.

According to an aspect of the present invention, there is provided a focal-plane shutter including: a board including an opening; a blade opening and closing the opening; a rotor of an actuator for driving the blade; an output member rotated by the rotor and including a first gear portion; a drive member including a second gear portion meshing with the first gear portion, rotating about a predetermined axis, and driving the blade; and a positioning portion abutting with the drive member and defining an end of a rotational range of the drive member, wherein the first and second gear portions and the positioning portion overlap one another in a plane direction perpendicular to the axis.

It is therefore possible to prevent the drive member from tilting relative to the rotational axis thereof in the rotation start position. Accordingly, it is possible to suppress the variation in the rotation start position of the drive member and the operating property of the blade.

What is claimed is:
1. A focal-plane shutter, comprising:
a board including an opening;
a blade opening and closing the opening;
a rotor of an actuator for driving the blade;

an output member rotated by the rotor and including a first gear portion;

a drive member including a second gear portion meshing with the first gear portion, rotating about a predetermined axis, and driving the blade; and a positioning portion abutting with the drive member and defining an end of a rotational range of the drive member, wherein the first and second gear portions and the positioning portion overlap one another in a plane direction perpendicular to the axis, wherein the first gear portion includes a first thin portion and a first thick portion different from each other in thickness in a direction of the axis, wherein the second gear portion includes a second thin portion and a second thick portion different from each other in thickness in the direction of the axis, and wherein when the drive member abuts with the positioning portion, the first and second thick portions mesh with each other, and the first and second thin portions are spaced from each other, and the first and second thick portions and the positioning portion overlap one another in the plane direction.

2. The focal-plane shutter of claim 1, wherein when the drive member is positioned in another end of the rotational range, the first and second thin portions mesh with each other, the first and second thick portions are spaced from each other, and the drive member partially overlaps the first thin portion in the direction of the axis.

3. The focal-plane shutter of claim 2, wherein when the drive member is positioned in the another end of the rotational range, the drive member partially overlaps the rotor in the direction of the axis.

4. The focal-plane shutter of claim 1, wherein the positioning portion is provided in the board.

5. An optical device comprising a focal-plane shutter, comprising:

a board including an opening;

a blade opening and closing the opening;

a rotor of an actuator for driving the blade;

an output member rotated by the rotor and including a first gear portion;

a drive member including a second gear portion meshing with the first gear portion, rotating about a predetermined axis, and driving the blade; and a positioning portion abutting with the drive member and defining an end of a rotational range of the drive member, wherein the first and second gear portions and the positioning portion overlap one another in a plane direction perpendicular to the axis, wherein the first gear portion includes a first thin portion and a first thick portion different from each other in thickness in a direction of the axis, wherein the second gear portion includes a second thin portion and a second thick portion different from each other in thickness in the direction of the axis, and wherein when the drive member abuts with the positioning portion, the first and second thick portions mesh with each other, and the first and second thin portions are spaced from each other, and the first and second thick portions and the positioning portion overlap one another in the plane direction.

6. A focal-plane shutter, comprising:

a board including an opening;

a blade opening and closing the opening;

a rotor of an actuator for driving the blade;

an output member rotated by the rotor and including a first gear portion;

a drive member including a second gear portion meshing with the first gear portion, rotating about a predetermined axis, and driving the blade; and a positioning portion abutting with the drive member and defining an end of a rotational range of the drive member, wherein the first and second gear portions and the positioning portion overlap one another in a plane direction perpendicular to the axis, wherein the first gear portion includes a first thin portion and a first thick portion different from each other in thickness in a direction of the axis, wherein the second gear portion includes a second thin portion and a second thick portion different from each other in thickness in the direction of the axis, and wherein when the drive member abuts with the positioning portion, the first and second thin portions mesh with each other, and the first and second thick portions are spaced from each other, and the first and second thin portions and the positioning portion overlap one another in the plane direction.

7. The focal-plane shutter of claim 6, wherein when the drive member is positioned in another end of the rotational range, the first and second thick portions mesh with each other, the first and second thin portions are spaced from each other, and the drive member partially overlaps the first thin portion in the direction of the axis.

8. The focal-plane shutter of claim 7, wherein the drive member partially overlaps the rotor in the direction of the axis.

* * * * *